(12) United States Patent
Song et al.

(10) Patent No.: US 9,877,307 B2
(45) Date of Patent: Jan. 23, 2018

(54) METHOD FOR IMPLEMENTING RADIO RESOURCE CONTROL PROTOCOL FUNCTION, MACRO BASE STATION, AND MICRO CELL NODE

(71) Applicant: Huawei Technologies Co., Ltd., Shenzhen (CN)

(72) Inventors: Weiwei Song, Shenzhen (CN); Bo Lin, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/812,985

(22) Filed: Jul. 29, 2015

(65) Prior Publication Data

US 2015/0334697 A1 Nov. 19, 2015

Related U.S. Application Data

(63) Continuation of application No. PCT/CN2013/071125, filed on Jan. 30, 2013.

(51) Int. Cl.
*H04W 72/00* (2009.01)
*H04W 4/00* (2009.01)
*H04W 72/04* (2009.01)
*H04W 68/00* (2009.01)
*H04W 48/12* (2009.01)
*H04W 36/04* (2009.01)
*H04W 84/04* (2009.01)

(52) U.S. Cl.
CPC ....... *H04W 72/0406* (2013.01); *H04W 48/12* (2013.01); *H04W 68/005* (2013.01); *H04W 36/04* (2013.01); *H04W 84/045* (2013.01)

(58) Field of Classification Search
CPC ... H04W 36/04; H04W 48/12; H04W 68/005; H04W 72/0406; H04W 84/045
USPC .......................................................... 455/450
See application file for complete search history.

(56) References Cited

U.S. PATENT DOCUMENTS

| 5,748,621 | A | * | 5/1998 | Masuda ............... | H04B 7/2643 370/337 |
| 7,853,259 | B2 | | 12/2010 | Xu et al. | |
| 2004/0002337 | A1 | | 1/2004 | Wheeler et al. | |
| 2004/0203623 | A1 | * | 10/2004 | Wu ......................... | H04L 1/188 455/412.1 |
| 2007/0165595 | A1 | * | 7/2007 | Xu ......................... | H04W 76/02 370/350 |

(Continued)

FOREIGN PATENT DOCUMENTS

| CN | 1535038 A | 10/2004 |
| CN | 101527941 A | 9/2009 |

(Continued)

*Primary Examiner* — Rafael Pérez-Gutiérrez
*Assistant Examiner* — Mark G. Pannell
(74) *Attorney, Agent, or Firm* — Slater Matsil, LLP

(57) ABSTRACT

In a method for implementing a Radio Resource Control (RRC) protocol function a macro base station configures control information required by a user equipment for accessing a micro cell node. The control information is sent to the micro cell node for combining the control information and control information that is preset by the micro cell node and forwarding the combined control information to a user equipment, or directly forwarding the control information to a user equipment, so as to implement all RRC protocol functions of the micro cell node.

15 Claims, 8 Drawing Sheets

(56) References Cited

U.S. PATENT DOCUMENTS

| | | | |
|---|---|---|---|
| 2009/0197630 A1* | 8/2009 | Ahn | H04L 1/0029 455/522 |
| 2011/0044282 A1* | 2/2011 | Seo | H04L 1/0072 370/329 |
| 2011/0319066 A1* | 12/2011 | Chou | H04W 36/0077 455/422.1 |
| 2013/0003673 A1* | 1/2013 | Dinan | H04W 72/0406 370/329 |
| 2013/0070692 A1* | 3/2013 | Miki | H04W 72/048 370/329 |
| 2013/0157669 A1* | 6/2013 | Turtinen | H04W 48/12 455/450 |
| 2013/0343270 A1* | 12/2013 | Abe | H04W 36/0005 370/328 |
| 2014/0004863 A1 | 1/2014 | Zhang et al. | |
| 2014/0079031 A1* | 3/2014 | Parkvall | H04L 5/0058 370/336 |
| 2014/0128092 A1 | 5/2014 | Xiong et al. | |
| 2014/0171091 A1* | 6/2014 | Cai | H04W 48/20 455/450 |
| 2014/0198655 A1* | 7/2014 | Ishii | H04W 76/023 370/235 |

FOREIGN PATENT DOCUMENTS

| | | | | |
|---|---|---|---|---|
| CN | 102208938 A | 10/2011 | | |
| CN | 102469557 A | 5/2012 | | |
| CN | 102883440 A | 1/2013 | | |
| EP | 2525615 A1 | 11/2012 | | |
| WO | WO 00/30394 A1 * | 5/2000 | | H04W 68/00 |
| WO | WO 2011/083650 A1 * | 7/2011 | | H04W 72/048 |
| WO | WO 2012/063792 A1 * | 5/2012 | | H04W 36/0005 |

\* cited by examiner

US 9,877,307 B2

METHOD FOR IMPLEMENTING RADIO RESOURCE CONTROL PROTOCOL FUNCTION, MACRO BASE STATION, AND MICRO CELL NODE

This application is a continuation of International Application No. PCT/CN2013/071125, filed on Jan. 30, 2013, which is hereby incorporated by reference in its entirety.

TECHNICAL FIELD

The present invention pertains to the communications field, and in particular, relates to a method for implementing a Radio Resource Control protocol function, a macro base station, and a micro cell node.

BACKGROUND

With development of mobile communications technologies and massive deployment of a 3rd generation mobile communications technology (3G) network, a high-rate and high-bandwidth communications service greatly improves user experience. However, more challenges are brought to operation of communications services although massive popularization of a smartphone injects new vitality into the communications services. Because a limited throughput of a 3G network cannot meet such heavy traffic, a current network of an operator has been faced with great pressure, and even massive deployment of a Long Term Evolution (LTE) system in future can meet only some demands. Due to its flexible deployment, low cost, and broadband transmission provided for a user, a micro cell has become a key direction in which an LTE network evolves. A micro cell node of the micro cell may be a micro cell node of a small cell, an indoor base station (Femto base station), a local wireless access point (AP), or a low power node (LPN).

In consideration of reducing costs of an access point and simplifying a function of the micro cell node, the micro cell node has no Radio Resource Control (RRC) protocol function layer or has only a simple RRC function layer, that is, the micro cell node cannot generate or parse a dedicated RRC message of a user equipment (UE), has no radio resource management function, or cannot generate all cell common control information. However, the function of the micro cell node is that the micro cell node independently allows access of a backward compatible UE, thereby implementing a necessary function for UE mobility. If the micro cell node does not have the function, access of the backward compatible UE is unavailable and a service cannot be provided for the backward compatible UE. The backward compatible UE refers to a UE in an earlier version. To access a cell, the backward compatible UE has the following requirements for a base station: needing system information, needing to receive a paging message, and needing to establish a relationship with the base station by using an RRC message.

SUMMARY

An objective of embodiments of the present invention is to provide a method for implementing a Radio Resource Control protocol function, so as to resolve a problem of how to use a macro base station to assist a micro cell node in implementing the RRC function.

According to a first aspect, a method for implementing a Radio Resource Control protocol function is provided, where the method includes: configuring, by a macro base station, control information; and sending the control information to a micro cell node, so that the micro cell node combines the control information and control information that is preset by the micro cell node and then forwards combined control information to a user, or directly forwards the control information to a user, so as to implement all Radio Resource Control protocol functions of the micro cell node.

With reference to the first aspect, in a first possible implementation manner of the first aspect, the control information includes cell common control information and dedicated control information of a user equipment UE, where the cell common control information includes system information and paging information.

With reference to the first aspect or the first possible implementation manner of the first aspect, in a second possible implementation manner of the first aspect, before the configuring, by a macro base station, control information, the method further includes performing negotiation between the macro base station and the micro cell node to determine the control information configured by the macro base station, where if the micro cell node has a part of simplified RRC functions and the micro cell node presets a part of control information, the control information configured by the macro base station includes only the dedicated control information of the user equipment UE; or if the micro cell node has no RRC function and/or the micro cell node does not preset control information, the control information configured by the macro base station includes all control information.

With reference to the first aspect, the first possible implementation manner of the first aspect, or the second possible implementation manner of the first aspect, in a third possible implementation manner of the first aspect, the configuring, by a macro base station, control information includes configuring, by the macro base station, a system information transmission configuration parameter for the micro cell node, where the system information transmission configuration parameter is information block content and transmission control information, the information block content includes all or a part of system information block content, and the transmission control information includes transmission control information of all or the part of the system information block content.

With reference to the third possible implementation manner of the first aspect, in a fourth possible implementation manner of the first aspect, the method further includes if a transmission control manner of all or the part of the system information block content is fixed, configuring, by the macro base station for the micro cell node, the system information transmission configuration parameter that does not include information block content of a preset transmission control manner; or if the information block content is transmitted in a non-periodic manner, configuring transmission control information that is corresponding to the information block content and includes scheduling information of the system information block content, where the scheduling information includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle, and if scheduling information of the multiple pieces of information block content is the same and the scheduling information includes an information block content group, the scheduling information includes an arrangement sequence of the information block content in the information block content group.

With reference to the fourth possible implementation manner of the first aspect, in a fifth possible implementation manner of the first aspect, the method further includes configuring, by the macro base station, a modification cycle of the system information of the micro cell node, where the modification cycle includes a cycle length and a start moment.

With reference to the fifth possible implementation manner of the first aspect, in a sixth possible implementation manner of the first aspect, the method further includes re-configuring, by the macro base station, a system information transmission configuration parameter for the micro cell node; and if content of the system information is updated, specifying, by the macro base station, a start moment at which the system information is updated, where the start moment is a specific moment or is indicated or preset on the micro cell node by the macro base station, and the specific moment is represented by a system frame number and a radio frame number, where that the start moment is indicated or preset on the micro cell node by the macro base station includes that the micro cell node starts to transmit updated content at a start moment of a next or an $N^{th}$ modification cycle.

With reference to the first aspect, the first possible implementation manner of the first aspect, or the second possible implementation manner of the first aspect, in a seventh possible implementation manner of the first aspect, the configuring, by a macro base station, control information includes: configuring, by the macro base station, a paging information transmission configuration parameter for the micro cell node, where the paging information transmission configuration parameter includes paging information content and paging transmission control information, and the paging transmission control information includes a Radio Link Control RLC transmission configuration parameter, a Media Access Control MAC layer transmission configuration parameter, and physical-layer transmission configuration information. The paging transmission control information includes a transmission moment corresponding to paging content, where the transmission moment is a moment of one time of transmission or moments of multiple times of transmission.

With reference to the seventh possible implementation manner of the first aspect, in an eighth possible implementation manner of the first aspect, the method further includes, when the transmission moment corresponding to the paging content is the moments of multiple times of transmission, configuring, by the macro base station when configuring the paging transmission control information, the transmission moments by using a transmission moment list or by using a start moment and a transmission cycle.

According to a second aspect, a method for implementing a Radio Resource Control protocol function is provided, where the method includes: receiving, by a micro cell node, control information sent by a macro base station; and forwarding the control information to a user, so that the micro cell node implements the RRC function.

With reference to the second aspect, in a first possible implementation manner of the second aspect, the control information includes, if the micro cell node has a part of simplified RRC functions and the micro cell node presets a part of control information, the control information configured by the macro base station includes only dedicated control information of a user equipment UE; and if the micro cell node has no RRC function and/or the micro cell node does not preset control information, the control information configured by the macro base station includes all control information, including cell common control information and the dedicated control information of the user equipment UE, where the cell common control information includes system information and paging information.

With reference to the second aspect or the first possible implementation manner of the second aspect, in a second possible implementation manner of the second aspect, the forwarding, by the micro cell node, the control information to a user includes carrying the forwarded control information by using a signaling radio bearer SRB or a data radio bearer DRB, where a control message transmitted by the SRB includes an RRC message transmitted through a common control channel CCCH or a dedicated control channel DCCH, and the RRC message transmitted through the DCCH is an RRC message including a non-access stratum NAS message and/or measurement information.

With reference to the second possible implementation manner of the second aspect, in a third possible implementation manner of the second aspect, before a step of receiving the dedicated control information that is of the UE and sent by the macro base station, the method further includes: receiving an RRC message that is transmitted by the user through a random access channel RACH; forwarding the RRC message and a user identifier to the macro base station; and receiving a bearer establishment request that is between the micro cell node and the macro base station and sent by the macro base station, where the bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user.

According to a third aspect, a macro base station is provided, where the macro base station includes: a configuring unit, configured to configure, by the macro base station, control information; and a first sending unit, configured to send the control information to a micro cell node, so that the micro cell node combines the control information and control information that is preset by the micro cell node and then forwards combined control information to a user, or directly forwards the control information to a user, so as to implement all Radio Resource Control protocol RRC functions of the micro cell node.

With reference to the third aspect, in a first possible implementation manner of the third aspect, the control information includes cell common control information and dedicated control information of a user equipment UE, where the cell common control information includes system information and paging information.

With reference to the third aspect or the first possible implementation manner of the third aspect, in a second possible implementation manner of the third aspect, the macro base station further includes a negotiating unit, configured to perform negotiation between the macro base station and the micro cell node to determine the control information configured by the macro base station, where if the micro cell node has a part of simplified RRC functions and the micro cell node presets a part of control information, the control information configured by the macro base station includes only the dedicated control information of the user equipment UE; or if the micro cell node has no RRC function and/or the micro cell node does not preset control information, the control information configured by the macro base station includes all control information.

With reference to the third aspect, the first possible implementation manner of the third aspect, or the second possible implementation manner of the third aspect, in a third possible implementation manner of the third aspect, the configuring unit is specifically configured to configure, by the macro base station, a system information transmission configuration parameter for the micro cell node, where the system information transmission configuration parameter is information block content and transmission control information, the information block content includes all or a part of system information block content content, and the transmission control information includes transmission control information of all or the part of the system information block content.

With reference to the third possible implementation manner of the third aspect, in a fourth possible implementation manner of the third aspect, the macro base station further includes: a first configuring subunit, configured to configure, by the macro base station for the micro cell node if a transmission control manner of all or the part of the system information block content is fixed, the system information transmission configuration parameter that does not include information block content of a preset transmission control manner; or if the information block content is transmitted in a non-periodic manner, configure transmission control information that is corresponding to the information block content and includes scheduling information of the system information block content, where the scheduling information includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle, and if scheduling information of the multiple pieces of information block content is the same and the scheduling information includes an information block content group, the scheduling information includes an arrangement sequence of the information block content in the information block content group.

With reference to the fourth possible implementation manner of the third aspect, in a fifth possible implementation manner of the third aspect, the macro base station further includes a second configuring subunit, configured to configure, by the macro base station, a modification cycle of the system information of the micro cell node, where the modification cycle includes a cycle length and a start moment.

With reference to the fifth possible implementation manner of the third aspect, in a sixth possible implementation manner of the third aspect, the macro base station further includes a third configuring subunit, configured to re-configure, by the macro base station, a system information transmission configuration parameter for the micro cell node; and if content of the system information is updated, specify, by the macro base station, a start moment at which the system information is updated, where the start moment is a specific moment or is indicated or preset on the micro cell node by the macro base station, and the specific moment is represented by a system frame number and a radio frame number, where that the start moment is indicated or preset on the micro cell node by the macro base station includes that the micro cell node starts to transmit updated content at a start moment of a next or an $N^{th}$ modification cycle.

With reference to the third possible implementation manner of the third aspect, or the second possible implementation manner of the third aspect, in a seventh possible implementation manner of the third aspect, the configuring unit is specifically configured to configure, by the macro base station, a paging information transmission configuration parameter for the micro cell node, where the paging information transmission configuration parameter includes paging information content and paging transmission control information, and the paging transmission control information includes a Radio Link Control RLC transmission configuration parameter, a Media Access Control MAC layer transmission configuration parameter, and physical-layer transmission configuration information, where the paging transmission control information includes a transmission moment corresponding to paging content, where the transmission moment is a moment of one time of transmission or moments of multiple times of transmission.

With reference to the seventh possible implementation manner of the third aspect, in an eighth possible implementation manner of the third aspect, the macro base station further includes a fourth configuring subunit, configured to: when the transmission moment corresponding to the paging content is the moments of multiple times of transmission, configure, by the macro base station when configuring the paging transmission control information, the transmission moments by using a transmission moment list or by using a start moment and a transmission cycle.

According to a fourth aspect, a micro cell node is provided, where the micro cell node includes: a first receiving unit, configured to receive, by the micro cell node, control information sent by a macro base station; and a first forwarding unit, configured to forward the control information to a user, so that the micro cell node implements a method of an RRC function.

With reference to the fourth aspect, in a first possible implementation manner of the fourth aspect, the control information includes, if the micro cell node has a part of simplified RRC functions and the micro cell node presets a part of control information, the control information configured by the macro base station includes only dedicated control information of a user equipment UE; and if the micro cell node has no RRC function and/or the micro cell node does not preset control information, the control information configured by the macro base station includes all control information, including cell common control information and the dedicated control information of the user equipment UE, where the cell common control information includes system information and paging information.

With reference to the fourth aspect or the first possible implementation manner of the fourth aspect, in a second possible implementation manner of the fourth aspect, the first forwarding unit is specifically configured to carry the forwarded control information by using a signaling radio bearer SRB or a data radio bearer DRB, where a control message transmitted by the SRB includes an RRC message transmitted through a common control channel CCCH or a dedicated control channel DCCH, and the RRC message transmitted through the DCCH is an RRC message including a non-access stratum NAS message and/or measurement information.

With reference to the second possible implementation manner of the fourth aspect, in a third possible implementation manner of the fourth aspect, the micro cell node further includes: a second receiving unit, configured to receive an RRC message transmitted by a user; a second forwarding unit, configured to forward the RRC message and a user identifier to the macro base station; and a third receiving unit, configured to receive a bearer establishment request that is between the micro cell node and the macro base station and sent by the macro base station, where the bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user.

Compared with the prior art, the embodiments of the present invention provide a method for implementing a Radio Resource Control protocol function. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that a user can camp on or be handed over to the micro cell node.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

Figure 1:
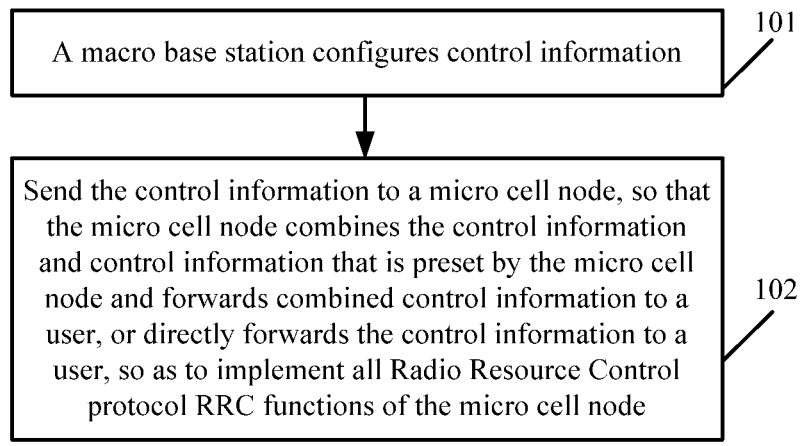
FIG. 1 is a flowchart of a method for implementing a Radio Resource Control protocol function according to an embodiment of the present invention.

Referring to FIG. 1, FIG. 1 is a flowchart of a method for implementing a Radio Resource Control protocol function according to an embodiment of the present invention. As shown in FIG. 1, the method includes the following steps.

Step 101: A macro base station configures control information. The control information includes cell common control information and dedicated control information of a user equipment (UE), where the cell common control information includes system information and paging information.

Optionally, before configuring, by a macro base station, control information required by a UE for accessing a micro cell node of a micro cell, the method further includes performing negotiation between the macro base station and the micro cell node to determine the control information configured by the macro base station, where if the micro cell node has a part of simplified RRC functions and the micro cell node presets a part of control information, the control information configured by the macro base station includes only the dedicated control information of the user equipment UE; or if the micro cell node has no RRC function and/or the micro cell node does not preset control information, the control information configured by the macro base station includes all control information.

Step 102: The macro base station sends the control information to a micro cell node, so that the micro cell node combines the control information and control information that is preset by the micro cell node and then forwards combined control information to a user, or directly forwards the control information to a user equipment, so as to implement all Radio Resource Control protocol RRC functions of the micro cell node.

Optionally, the configuring, by a macro base station, control information includes configuring, by the macro base station, a system information transmission configuration parameter for the micro cell node, where the system information transmission configuration parameter is information block content and transmission control information, the information block content includes all or a part of system information block content content, and the transmission control information includes transmission control information of all or the part of the system information block content.

The system information transmission configuration parameter includes the information block content and the transmission control information of the system information. The information block content includes all or the part of the system information block content, for example, master information block (MIB) content, system information block (SIB) 1 content, SIB 2 content, and SIB 3 content. The transmission control information includes transmission control information of all or the part of the system information block content, for example, MIB transmission control information, SIB 1 transmission control information, SIB 2 transmission control information, and SIB 3 transmission control information.

Specifically, content included in different system information blocks is different For example, and MIB includes downlink bandwidth, PHICH configuration information, and a system frame number (SFN), while a SIB 1 includes a cell access parameter, a cell selection parameter, system information scheduling information, and the like. Content of transmission control information of different system information blocks is also different. Generally, transmission control information of each system information block includes: an RLC transmission manner, a MAC transmission manner, and a physical-layer transmission manner. The RLC transmission manner is one of transparent mode (TM), unacknowledged mode (UM), and acknowledged mode (AM). The information about the MAC transmission manner includes whether segmentation is allowed, a mapped transmission channel, whether a HARQ mechanism is used, how to use a HARQ configuration parameter, and the like. The physical-layer transmission manner includes a physical transmission channel, a transmission time-frequency resource, and a modulation and coding scheme.

Optionally, the method further includes: if a transmission control manner of all or the part of the system information block content is fixed, configuring, by the macro base station for the micro cell node, the system information transmission configuration parameter that does not include information block content of a preset transmission control manner; or if the information block content is transmitted in a non-periodic manner, the macro base station configures, by the macro base station, transmission control information that is corresponding to the information block content and includes scheduling information of the system information block content, where the scheduling information includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle, and if scheduling information of the multiple pieces of information block content is the same and the scheduling information includes an information block content group, the scheduling information includes an arrangement sequence of the information block content in the information block content group.

Optionally, the method further includes configuring, by the macro base station, a modification cycle of the system information of the micro cell node, where the modification cycle includes a cycle length and a start moment.

Optionally, the method further includes reconfiguring, by the macro base station, a system information transmission configuration parameter for the micro cell node; and if content of the system information is updated, the macro base station specifies a start moment at which the system information is updated, where the start moment is a specific moment or is indicated or preset on the micro cell node by the macro base station, and the specific moment is represented by a system frame number and a radio frame number, where that the start moment is indicated or preset on the micro cell node by the macro base station includes that the micro cell node starts to transmit updated content at a start moment of a next or an $N^{th}$ modification cycle.

Optionally, the configuring, by a macro base station, control information includes configuring, by the macro base station, a paging information transmission configuration parameter for the micro cell node, where the paging information transmission configuration parameter includes paging information content and paging transmission control information, and the paging transmission control information includes: an RLC transmission configuration parameter, a MAC layer transmission configuration parameter, and physical-layer transmission configuration information, where the paging transmission control information includes a transmission moment corresponding to paging content, where the transmission moment is a moment of one time of transmission or moments of multiple times of transmission.

Specifically, the macro base station configures the system paging information transmission configuration parameter for the micro cell node, where the paging information transmission configuration parameter includes the paging information content and the paging transmission control information, and the macro base station may configure, at a time, one or more pieces of paging information content and one or more pieces of transmission control information corresponding to the one or more pieces of paging information content. For example, a paging configuration includes two pieces of paging content and two pieces of transmission control information, that is, paging information content 1 and transmission control information 1, and paging information content 2 and transmission control information 2. The paging transmission control information includes: the RLC transmission configuration parameter, for example, a transparent transmission mode; the MAC layer transmission configuration parameter, including transmission channel mapping, whether a hybrid automatic repeat request (HARQ) mechanism is used, and the like, for example, a transparent transmission manner is used on a MAC layer for transmission through a broadcast channel (BCH) to a physical entity and the HARQ mechanism is not used; and the physical-layer transmission configuration information, for example, a moment is transmitted on a physical layer through a physical downlink control channel (PDCCH) or physical downlink shared channel (PDSCH), for example, a transmission moment that is corresponding to paging content and included in the paging transmission control information may be a moment (an SFN and a subframe number) of one time of transmission or moments of multiple times of transmission. If the transmission moment corresponding to the paging content is the moments of multiple times of transmission, the information may be used to configure the transmission moments by using a transmission moment list or by using a start moment and a transmission cycle.

Optionally, the method further includes, when the transmission moment corresponding to the paging content is the moments of multiple times of transmission, configuring, by the macro base station when configuring the paging transmission control information, the transmission moments by using a transmission moment list or by using a start moment and a transmission cycle.

Optionally, the configuring, by a macro base station, control information includes configuring, by the macro base station, dedicated control information of a user equipment, where the dedicated control information of the user equipment includes a control message transmitted by using a signaling radio bearer (SRB), where the control message transmitted by the SRB includes an RRC message transmitted through a common control channel (CCCH) or an RRC message transmitted through a dedicated control channel (Dedicated Control Channel, DCCH), and the RRC message transmitted through the DCCH is an RRC message including a non-access stratum NAS message and/or measurement information.

Optionally, before a step of receiving the dedicated control information sent by the macro base station, the method further includes: receiving a request message of the micro cell node, where the request message carries an RRC message of the UE; determining, by the macro base station, whether the user equipment is allowed to access the micro cell node; and if the macro base station determines that the user equipment is allowed to access the micro cell node, sending, by the macro base station, a bearer establishment request to the micro cell node, so that the micro cell node establishes a control information bearer between the micro cell node and the macro base station.

This embodiment of the present invention provides a method for implementing a Radio Resource Control protocol function. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that a user equipment can camp on or be handed over to the micro cell node.

Figure 2:
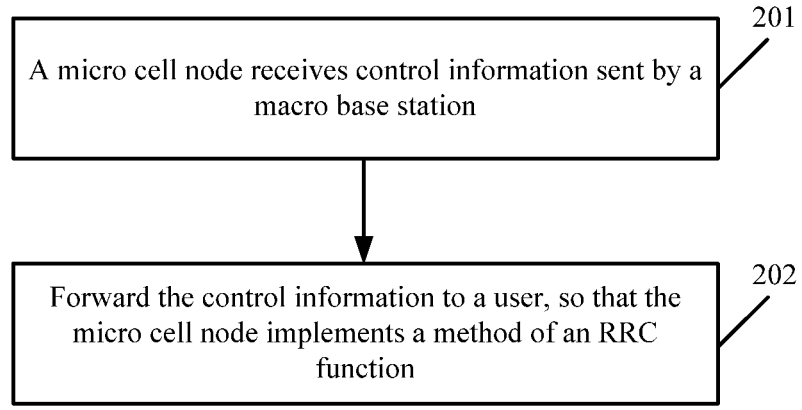
FIG. 2 is a flowchart of another method for implementing a Radio Resource Control protocol function according to an embodiment of the present invention.

Referring to FIG. 2, FIG. 2 is a flowchart of another method for implementing a Radio Resource Control protocol function according to an embodiment of the present invention. As shown in FIG. 2, the method includes the following steps.

Step 201: A micro cell node receives control information sent by a macro base station. The control information includes, if the micro cell node has a part of simplified RRC functions and the micro cell node presets a part of control information, the control information configured by the macro base station includes only dedicated control information of a user equipment UE; and if the micro cell node has no RRC function and/or the micro cell node does not preset control information, the control information configured by the macro base station includes all control information, including cell common control information and the dedicated control information of the user equipment UE, where the cell common control information includes system information and paging information.

Step 202: Forward the control information to a user equipment, so that the micro cell node implements the RRC function.

Optionally, the forwarding, by the micro cell node, the control information to a user equipment includes carrying the forwarded control information by using a signaling radio bearer SRB or a data radio bearer DRB, where a control message transmitted by the SRB includes an RRC message transmitted through a common control channel CCCH or a dedicated control channel DCCH, and the RRC message transmitted through the DCCH is an RRC message including a non-access stratum NAS message and/or measurement information.

Optionally, before the receiving the dedicated control information that is of the UE and sent by the macro base station, the method further includes: receiving an RRC message that is transmitted by the user equipment through a random access channel (RACH); forwarding the RRC message and a user equipment identifier to the macro base station; and receiving a bearer establishment request that is between the micro cell node and the macro base station and sent by the macro base station, where the bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user equipment.

This embodiment of the present invention provides a method for implementing a Radio Resource Control protocol function. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that the user equipment can camp on or be handed over to the micro cell node.

Figure 3:
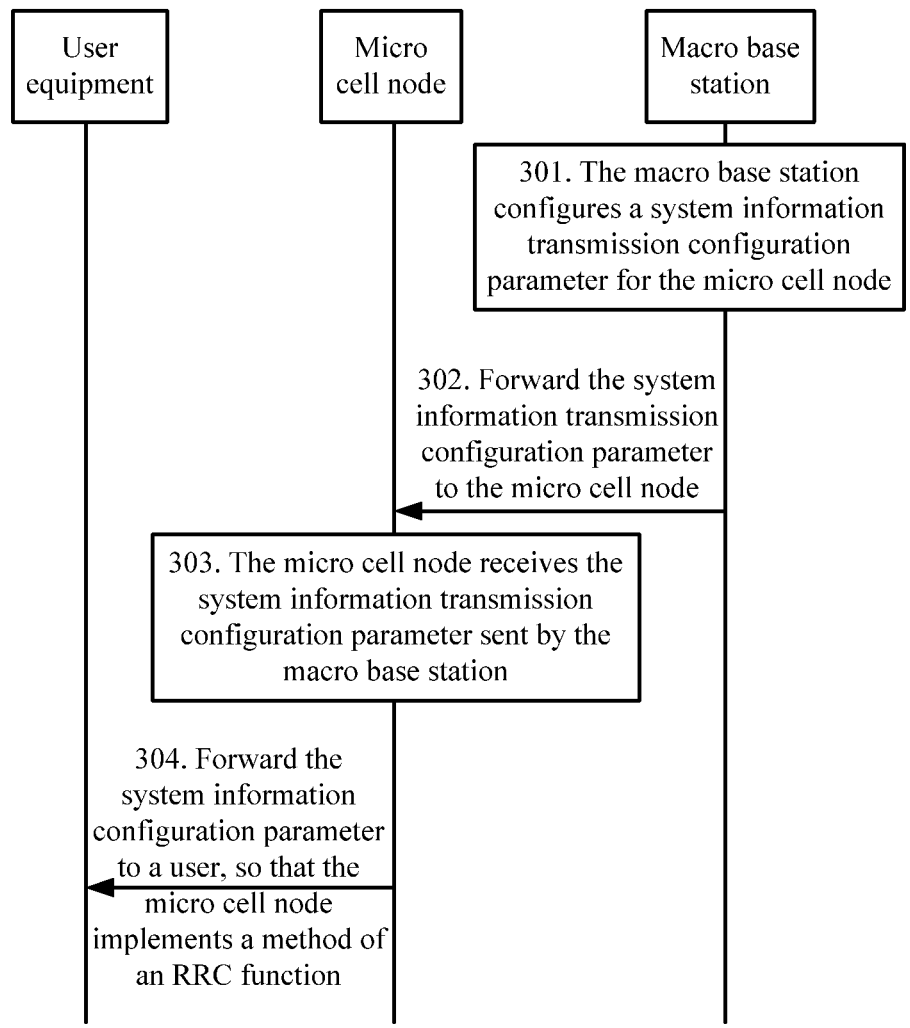
FIG. 3 is a flowchart of another method for implementing a Radio Resource Control protocol function according to an embodiment of the present invention.

Referring to FIG. 3, FIG. 3 is a flowchart of another method for implementing a Radio Resource Control protocol function according to an embodiment of the present invention. As shown in FIG. 3, the method includes the following steps.

Step 301: A macro base station configures a system information transmission configuration parameter for a micro cell node.

The system information transmission configuration parameter includes information block content and transmission control information of system information. The information block content includes all or a part of system information block content, for example, master information block content content, system information block content 1 content, SIB 2 content, and SIB 3 content. The transmission control information includes transmission control information of all or the part of the system information block content, for example, MIB transmission control information, SIB 1 transmission control information, SIB 2 transmission control information, and SIB 3 transmission control information.

Specifically, transmission control information of the master information block content may include: an RLC transmission configuration parameter, for example, a transparent transmission mode; a MAC layer transmission configuration parameter, including transmission channel mapping, whether a HARQ mechanism is used, and the like, for example, a transparent transmission manner is used on a MAC layer for transmission through a BCH channel to a physical entity and the HARQ mechanism is not used; and physical-layer transmission configuration information, for example, a time-frequency resource is transmitted through a PBCH, for example, the time-frequency resource is an SFN and a subframe number and a frequency domain is an RB number, a modulation and coding scheme, and a transmission cycle. Transmission control information of the system information block content (SIB) may include an RLC transmission mode, for example, a transparent transmission mode; a MAC layer transmission mode, including transmission channel mapping, whether a HARQ mechanism is used, and the like, for example, a transparent transmission manner is used on a MAC layer for transmission through a BCH channel to a physical entity and the HARQ mechanism is not used; and a physical transmission configuration, for example, a physical-layer transmission channel and a dedicated temporary identifier; and system information block content that is transmitted periodically further includes a transmission cycle.

The method further includes, if a transmission control manner of all or the part of the system information block content is fixed, for example, the transmission control manner of the system information block content is fixed in the micro cell node, configuring, by the macro base station for the micro cell node, the system information transmission configuration parameter that may not include information block content of a preset transmission control manner; or if the information block content is transmitted in a non-periodic manner, configuring transmission control information that is corresponding to the information block content and includes scheduling information of the system information block content, where the scheduling information is used to indicate a moment or a range of a transmission moment at which the micro cell node transmits the information block content. The scheduling information specifically includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle. Specifically, the information block content starts to be transmission from a start moment of each scheduling cycle and within a range of the transmission window length. If scheduling information of multiple pieces of information block content is the same and the scheduling information includes an information block content group, the scheduling information includes an arrangement sequence of the information block content in the information block content group.

The method further includes configuring, by the macro base station, the transmission control information that may further include a modification cycle of the system information, where the modification cycle includes a cycle length and a start moment.

The method further includes receiving a system information transmission configuration parameter re-configured by the macro base station for the micro cell node; if content of the system information is updated, specifying, by the macro base station, a start moment at which the system information is updated, where the start moment is a specific moment or is indicated or preset on the micro cell node by the macro base station, and the specific moment is represented by a system frame number and a radio frame number, where that the start moment is indicated or preset on the micro cell node by the macro base station is specifically that: the micro cell node starts to transmit updated content at a start moment of a next or an $N^{th}$ modification cycle.

Step 302: Forward the system information transmission configuration parameter to the micro cell node.

Step 303: The micro cell node receives the system information transmission configuration parameter sent by the macro base station.

Step 304: Forward the system information transmission configuration parameter to a user equipment, so that the micro cell node implements the RRC function.

The micro cell node establishes a transmission radio bearer according to the received transmission configuration parameter, specifically including an RLC, MAC, or MAC physical layer configuration, so as to transmit system information. The micro cell node transmits the system information between user equipments according to the system information block content and the transmission control information.

This embodiment of the present invention provides a method for implementing a Radio Resource Control protocol function. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that the user equipment can camp on or be handed over to the micro cell node.

Figure 4:
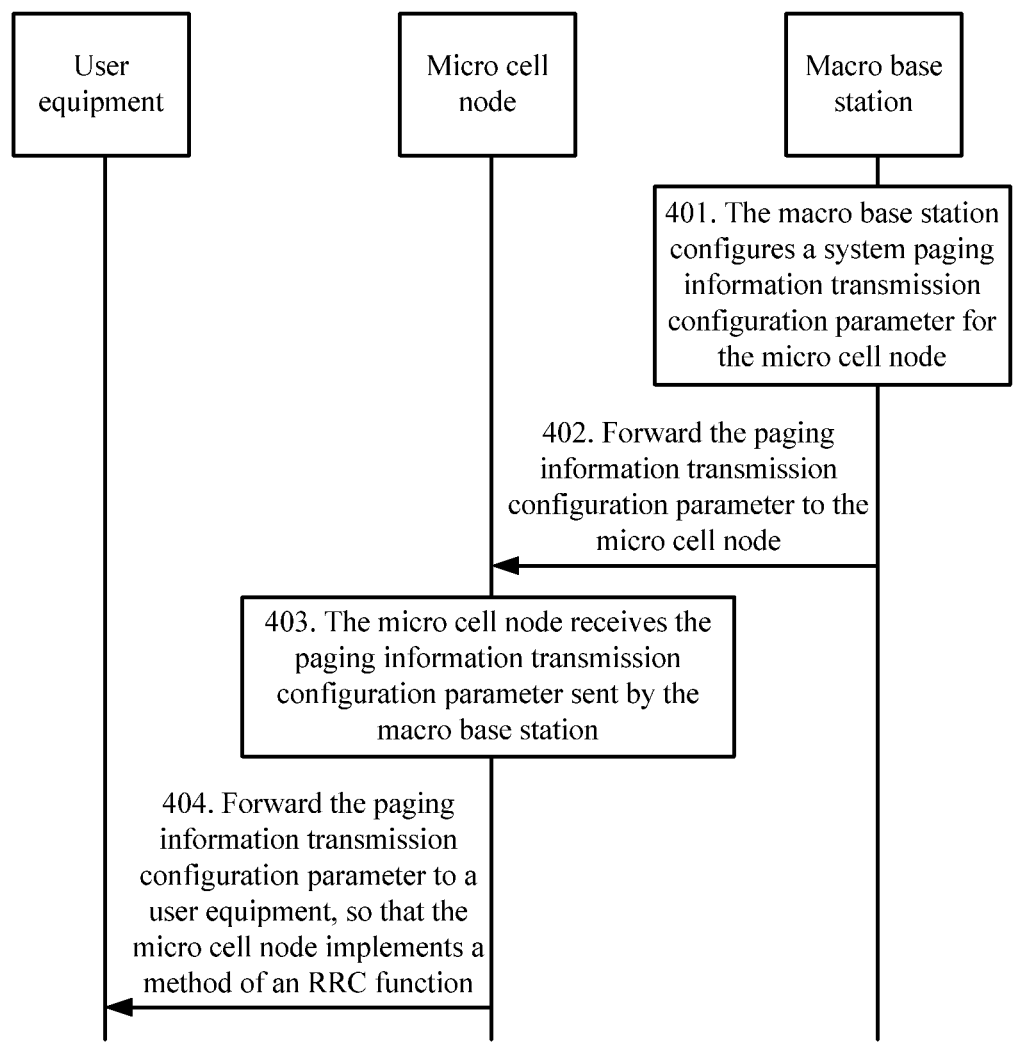
FIG. 4 is a flowchart of a method for implementing a Radio Resource Control protocol function according to an embodiment of the present invention.

Referring to FIG. 4, FIG. 4 is a schematic diagram of a method for implementing a Radio Resource Control protocol function according to an embodiment of the present invention. As shown in FIG. 4, the method includes the following steps.

Step 401: A macro base station configures a paging information transmission configuration parameter for a micro cell node.

Specifically, the macro base station configures the system paging information transmission configuration parameter for the micro cell node, where the paging information transmission configuration parameter includes paging information content and paging transmission control information, and the macro base station may configure, at a time, one or more pieces of paging information content and one or more pieces of transmission control information corresponding to the one or more pieces of paging information content. For example, a paging configuration includes two pieces of paging content and two pieces of transmission control information, that is, paging information content 1 and transmission control information 1, and paging information content 2 and transmission control information 2. The paging transmission control information includes: an RLC transmission configuration parameter, for example, a transparent transmission mode; a MAC layer transmission configuration parameter, including transmission channel mapping, whether a HARQ mechanism is used, and the like, for example, a transparent transmission manner is used on a MAC layer for transmission through a BCH channel to a physical entity and the HARQ mechanism is not used; and physical-layer transmission configuration information, for example, a moment is transmitted on a physical layer through a PDCCH channel and a PDSCH channel, for example, a transmission moment that is corresponding to paging content and included in the paging transmission control information may be a moment (an SFN and a subframe number) of one time of transmission or moments of multiple times of transmission. If the transmission moment corresponding to the paging content is the moments of multiple times of transmission, the information may be used to configure the transmission moments by using a transmission moment list or by using a start moment and a transmission cycle.

Step 402: Forward the paging information transmission configuration parameter to the micro cell node.

Step 403: The micro cell node receives the paging information transmission configuration parameter sent by the macro base station.

Step 404: Forward the paging information transmission configuration parameter to a user equipment, so that the micro cell node implements the RRC function.

Specifically, the forwarding the paging information transmission configuration parameter to a user equipment is specifically transmitting the obtained paging information transmission configuration parameter through a PDCCH channel or a PDSCH channel to a user equipment.

The micro cell node establishes a transmission radio bearer according to the received paging transmission control information parameter, specifically including an RLC, MAC, or MAC physical layer configuration, so as to transmit system information. The micro cell node transmits the system information between user equipments according to the system information block content and the transmission control information.

This embodiment of the present invention provides a method for implementing a Radio Resource Control protocol function. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that the user equipment can camp on or be handed over to the micro cell node.

Figure 5:
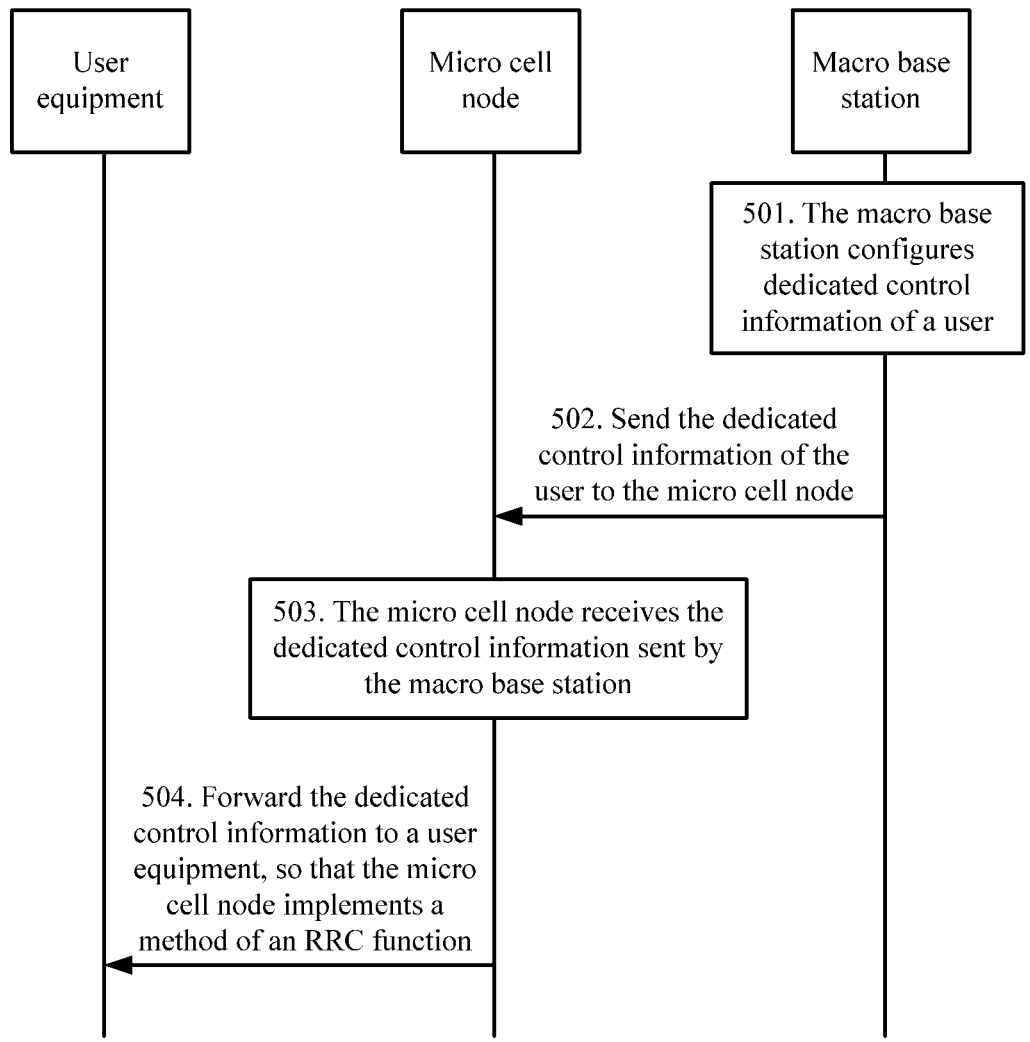
FIG. 5 is a flowchart of another method for implementing a Radio Resource Control protocol function according to an embodiment of the present invention.

Referring to FIG. 5, FIG. 5 is a flowchart of another method for implementing a Radio Resource Control protocol function according to an embodiment of the present invention. As shown in FIG. 5, the method includes the following steps:

Step 501: A macro base station configures dedicated control information of a user equipment.

Specifically, the dedicated control information of the user equipment includes a control message transmitted by an SRB. Specifically, the control message includes an RRC message transmitted through a CCCH or an RRC message transmitted through a DCCH, and the RRC message transmitted through the DCCH is an RRC message including a NAS message and/or measurement information.

Step 502: Send the dedicated control information of the user equipment to a micro cell node.

Optionally, before the sending the dedicated control information of the user equipment to a micro cell node, the method may further include: receiving a request message of the micro cell node, where the request message carries an RRC message of a UE; determining, by the macro base station, whether the user equipment is allowed to access the micro cell node; and if the macro base station determines that the user equipment is allowed to access the micro cell node, sending, by the macro base station, a bearer establishment request to the micro cell node, so that the micro cell node establishes a control information bearer between the micro cell node and the macro base station.

Specifically, the UE identifies, according to information that is about a UE identifier and included in uplink transmission scheduled for the first time in a random access process, that the information is control information transmitted by the UE. The UE identifier may be a NAS-layer UE identifier or an AS-layer UE identifier. The message may be a request message for initial access or RRC connection re-establishment of the UE. For example, when the uplink transmission scheduled by the UE for the first time includes the NAS-layer UE identifier, the micro cell node may identify that a message carried in the transmission is an RRC connection establishment request message of the UE. The micro cell node forwards the RRC message and the UE identifier to the macro base station through an interface between the micro cell node and the macro base station.

Step 503: The micro cell node receives the dedicated control information sent by the macro base station.

Optionally, before the receiving the dedicated control information that is of the UE and sent by the macro base station, the method further includes: receiving an RRC message that is transmitted by the user equipment through a random access channel (Random Access Channel, RACH); forwarding the RRC message and a user identifier to the macro base station; and receiving a bearer establishment request that is between the micro cell node and the macro base station and sent by the macro base station, where the bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user equipment.

Step 504: Forward the dedicated control information to a user equipment, so that the micro cell node implements the RRC function.

This embodiment of the present invention provides a method for implementing a Radio Resource Control protocol function. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that the user equipment can camp on or be handed over to the micro cell node.

Figure 6:
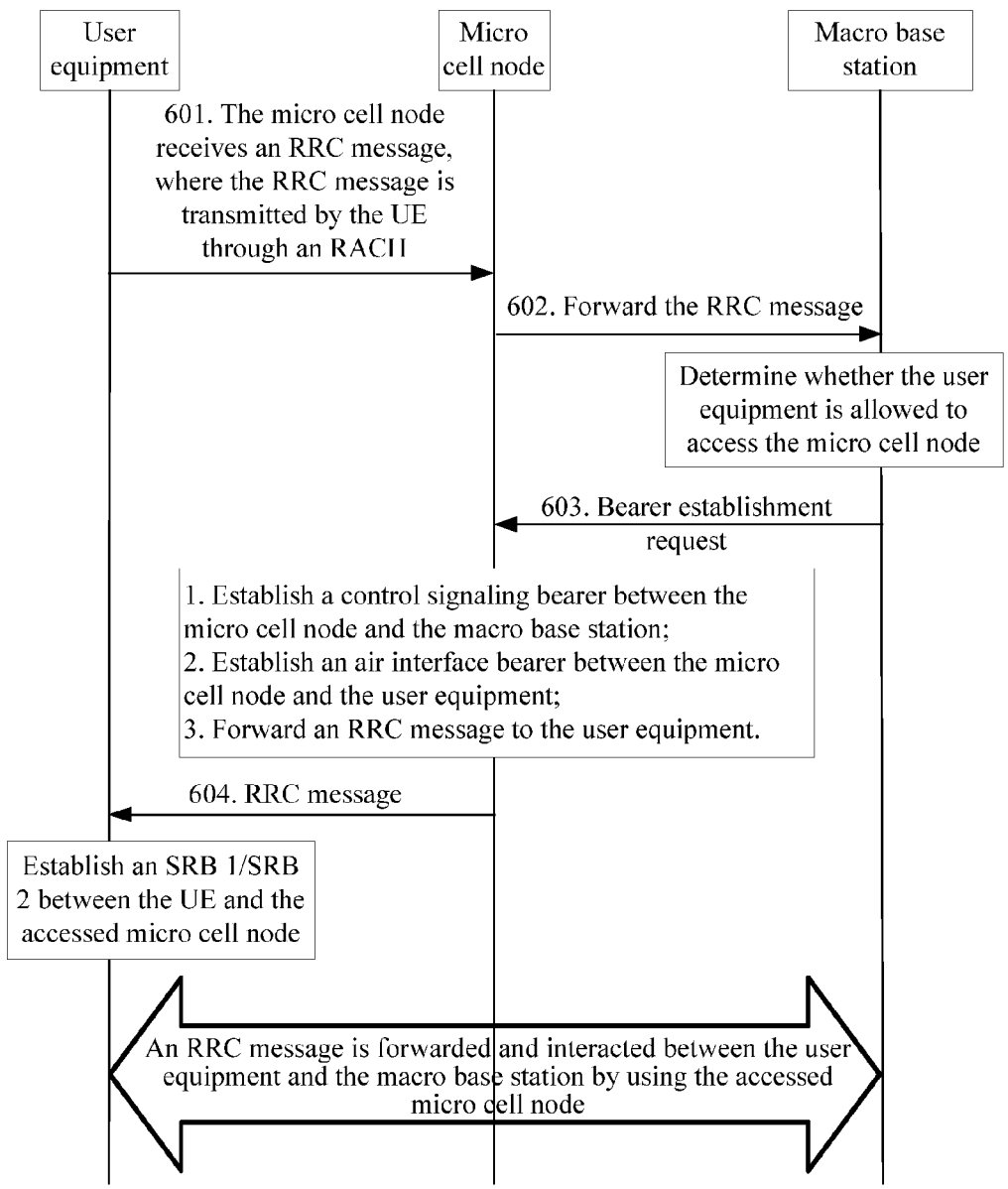
FIG. 6 is a flowchart of another method for implementing a Radio Resource Control protocol function according to an embodiment of the present invention.

Referring to FIG. 6, FIG. 6 is a flowchart of another method for implementing a Radio Resource Control protocol function according to an embodiment of the present invention.

Dedicated control signaling of a UE includes an RRC message transmitted by an SRB 0, an SRB 1, or an SRB 2. The SRB 0 is used to transmit an RRC message transmitted through a CCCH, the SRB 1 is used to transmit an RRC message through a DCCH, and the SRB 2 is used to transmit, through a DCCH and includes a NAS message and/or measurement information. A micro cell node does not parse or process, but only transparently transmit the dedicated control signaling of the UE. A process of establishing a control signaling transmission path between the micro cell node and a macro base station and performing control signaling transmission is as follows.

Step 601: The micro cell node receives an RRC message that is transmitted by the UE through a RACH.

The UE identifies, according to information that is about a UE identifier and included in uplink transmission scheduled for the first time in a random access process, that the information is control information transmitted by the UE SRB 0. The UE identifier may be a NAS-layer UE identifier or an AS-layer UE identifier. The message may be a request message for initial access or RRC connection re-establishment of the UE. For example, when the uplink transmission scheduled by the UE for the first time includes the NAS-layer UE identifier, the micro cell node may deem that a message carried in the transmission is an RRC connection establishment request message of the UE. The micro cell node forwards the RRC message and the UE identifier to the macro base station through an interface between the micro cell node and the macro base station.

Step 602: The micro cell node forwards the RRC message and a UE identifier to the macro base station through an interface between the micro cell node and the macro base station.

Step 603: The micro cell node receives a bearer establishment request that is between the micro cell node and the macro base station and sent by the macro base station.

The bearer establishment request message includes the following information.

1.) A configuration parameter for establishing a control signaling transmission bearer that is between the macro base station and the micro cell node and corresponding to the SRB 1 and/or the SRB 2. Each bear includes a bearer identifier and a GPRS Tunneling Protocol (GTP) tunnel parameter, where the tunnel parameter is a GTP tunnel parameter for the macro base station side, including a transport-layer identifier and a GPRS Tunneling Protocol tunnel end identifier (GTP-TEID), and is used to identify an address of the bearer on the macro base station side; and carrying the parameter indicates establishing one GTP tunnel for each bearer between the macro base station and the micro cell node, where transferring over a signaling bearer between the macro base station and the micro cell node is performed through the GTP tunnel;

2.) A configuration parameter for establishing a signaling radio bearer SRB 1 and/or SRB 2 between the micro cell node and the UE. An SRB configuration parameter is used to establish an SRB bearer between the micro cell node and the UE for transmission over an air interface. SRB configuration information of the micro cell node specifically includes a Packet Data Convergence Protocol (Packet Data Convergence Protocol, PDCP) configuration parameter, an RLC configuration parameter, a logical channel identifier, and a logical channel configuration parameter. The PDCP configuration parameter includes all or a part of a PDCP entity parameter, for example, discard timer duration and a head compression parameter; the RLC configuration parameter includes all or a part of an RLC entity parameter, for example, an RLC-layer mode configuration, where the RLC-layer mode configuration includes a configuration parameter of configuration modes: an RLC acknowledged mode (AM), an RLC unacknowledged mode (UM), and a transparent mode (TM); and the logical channel configuration parameter includes an uplink configuration parameter and a downlink configuration parameter, for example, a logical channel priority, a prioritized bit rate, and a logical channel group identifier; and 3.) An RRC message transferred in a link between the UE and the micro cell node.

Step 604: The micro cell node establishes a GTP bearer between the micro cell node and the macro base station and feeds back a bearer parameter on a micro cell node side to the macro base station; at the same time, the micro cell node forwards, to the UE, the RRC message sent by the macro base station, and the UE uses the message to establish an RRC connection between the UE and the micro cell node.

After that, establishment of a bearer between the macro base station and the micro cell node and an SRB bearer between the micro cell node and the UE that are for the dedicated control signaling of the UE is complete. After that, uplink dedicated control signaling and downlink dedicated control signaling of the UE are forwarded by the micro cell node between the UE and the macro base station.

This embodiment of the present invention provides a method for implementing a Radio Resource Control protocol function. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that the user equipment can camp on or be handed over to the micro cell node.

Figure 7:
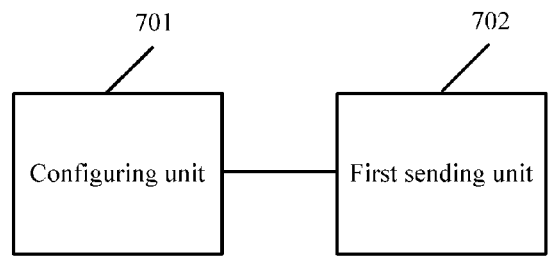
FIG. 7 is a structural device diagram of a macro base station according to an embodiment of the present invention.

FIG. 7 is a structural device diagram of a macro base station according to an embodiment of the present invention. As shown in FIG. 7, the device includes the following units a configuring unit 701, configured to configure, by the macro base station, control information. The control information includes cell common control information and dedicated control information of a user equipment UE, where the cell common control information includes system information and paging information.

Optionally, the macro base station further includes a negotiating unit, configured to perform negotiation between the macro base station and a micro cell node to determine the control information configured by the macro base station, where if the micro cell node has a part of simplified RRC functions and the micro cell node presets a part of control information, the control information configured by the macro base station includes only the dedicated control information of the user equipment UE; or if the micro cell node has no RRC function and/or the micro cell node does not preset control information, the control information configured by the macro base station includes all control information.

Optionally, the configuring unit 701 is specifically configured to configure, by the macro base station, a system information transmission configuration parameter for the micro cell node, where the system information transmission configuration parameter is information block content and transmission control information, the information block content includes all or a part of system information block content content, and the transmission control information includes transmission control information of all or the part of the system information block content.

Figure 8:
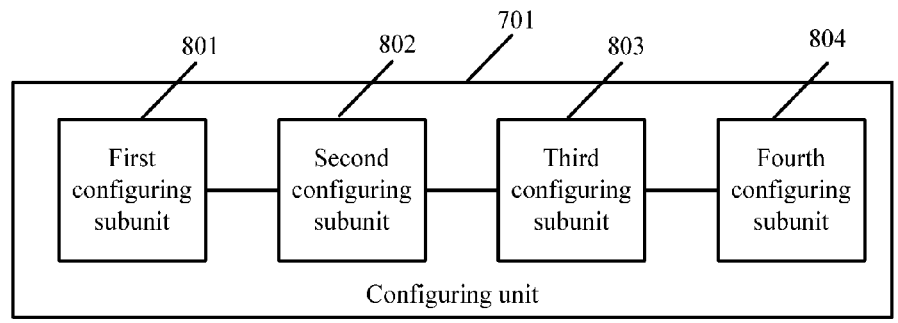
FIG. 8 is a structural device diagram of a configuring unit in a macro base station according to an embodiment of the present invention.

Optionally, referring to FIG. 8, FIG. 8 is a structural device diagram of a configuring unit in a macro base station according to an embodiment of the present invention. The macro base station further includes: a first configuring subunit 801, configured to configure, by the macro base station for the micro cell node, if a transmission control manner of all or the part of the system information block content is fixed, the system information transmission configuration parameter that does not include information block content of a preset transmission control manner; or if the information block content is transmitted in a non-periodic manner, configure transmission control information that is corresponding to the information block content and includes scheduling information of the system information block content, where the scheduling information includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle, and if scheduling information of the multiple pieces of information block content is the same and the scheduling information includes an information block content group, the scheduling information includes an arrangement sequence of the information block content in the information block content group.

Optionally, the macro base station further includes a second configuring subunit 802, configured to configure, by the macro base station, a modification cycle of the system information of the micro cell node, where the modification cycle includes a cycle length and a start moment.

Optionally, the macro base station further includes a third configuring subunit 803, configured to re-configure, by the macro base station, a system information transmission configuration parameter for the micro cell node; and if content of the system information is updated, specify, by the macro base station, a start moment at which the system information is updated, where the start moment is a specific moment or is indicated or preset on the micro cell node by the macro base station, and the specific moment is represented by a system frame number and a radio frame number. That the start moment is indicated or preset on the micro cell node by the macro base station includes that the micro cell node starts to transmit updated content at a start moment of a next or an $N^{th}$ modification cycle.

Optionally, the configuring unit 701 is specifically configured to configure, by the macro base station, a paging information transmission configuration parameter for the micro cell node, where the paging information transmission configuration parameter includes paging information content and paging transmission control information, and the paging transmission control information includes a Radio Link Control RLC transmission configuration parameter, a Media Access Control MAC layer transmission configuration parameter, and physical-layer transmission configuration information. The paging transmission control information includes a transmission moment corresponding to paging content, where the transmission moment is a moment of one time of transmission or moments of multiple times of transmission.

Optionally, the macro base station further includes: a fourth configuring subunit 804, configured to: when the transmission moment corresponding to the paging content is the moments of multiple times of transmission, configure, by the macro base station when configuring the paging transmission control information, the transmission moments by using a transmission moment list or by using a start moment and a transmission cycle; and a first sending unit 702, configured to send the control information to the micro cell node, so that the micro cell node forwards the control information to a user equipment, so as to implement a Radio Resource Control protocol RRC function of the micro cell node.

Figure 9:
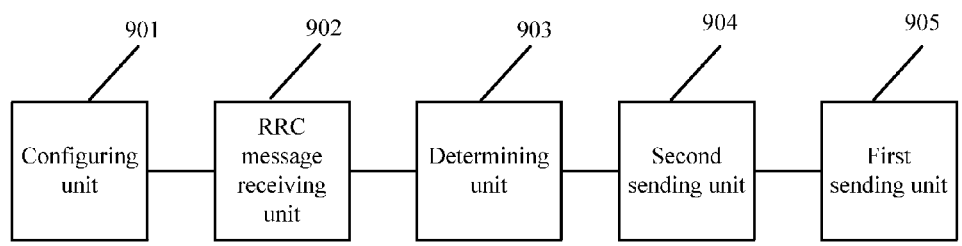
FIG. 9 is a structural device diagram of another macro base station according to an embodiment of the present invention.

In another optional embodiment, referring to FIG. 9, FIG. 9 is a structural device diagram of another macro base station according to an embodiment of the present invention. The macro base station further includes: a configuring unit 901, specifically configured to configure, by the macro base station, dedicated control information of the user equipment, where the dedicated control information of the user equipment includes a control message transmitted by an SRB, where the control message transmitted by the SRB includes an RRC message transmitted through a CCCH or an RRC message transmitted through a DCCH, and the RRC message transmitted through the DCCH is an RRC message including a non-access stratum NAS message and/or measurement information; an RRC message receiving unit 902, configured to receive a request message of the micro cell node, where the request message carries an RRC message of the UE; a determining unit 903, configured to determine, by the macro base station, whether the user equipment is allowed to access the micro cell node; a second sending unit 904, configured to: if the macro base station determines that the user equipment is allowed to access the micro cell node, send, by the macro base station, a bearer establishment request to the micro cell node, so that the micro cell node establishes a control information bearer between the micro cell node and the macro base station; and a first sending unit 905, configured to send the control information to the micro cell node, so that the micro cell node forwards the control information to the user equipment, so as to implement a Radio Resource Control protocol function of the micro cell node.

This embodiment of the present invention provides a macro base station. The macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common information, so that the user equipment can camp on or be handed over to the micro cell node.

Figure 10:
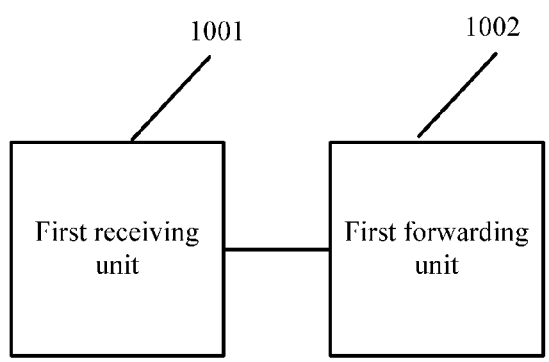
FIG. 10 is a structural device diagram of a micro cell node according to an embodiment of the present invention.

Referring to FIG. 10, FIG. 10 is a structural device diagram of a micro cell node according to an embodiment of the present invention. As shown in FIG. 10, the device includes the following units: a first receiving unit 1001, configured to receive, by the micro cell node, control information sent by a macro base station, where the control information includes: if the micro cell node has a part of simplified RRC functions and the micro cell node presets a part of control information, the control information configured by the macro base station includes only dedicated control information of a user equipment UE; and if the micro cell node has no RRC function and/or the micro cell node does not preset control information, the control information configured by the macro base station includes all control information, including cell common control information and the dedicated control information of the user equipment UE, where the cell common control information includes system information and paging information; and a first forwarding unit 1002, configured to forward the control information to a user equipment, so that the micro cell node implements a method of an RRC function.

Optionally, the first forwarding unit 1002 is specifically configured to carry the forwarded control information by using a signaling radio bearer SRB or a data radio bearer DRB, where a control message transmitted by the SRB includes an RRC message transmitted through a common control channel CCCH or a dedicated control channel DCCH, and the RRC message transmitted through the DCCH is an RRC message including a non-access stratum NAS message and/or measurement information.

Figure 11:
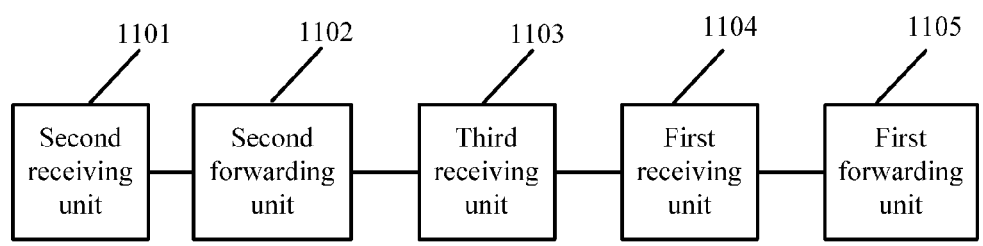
FIG. 11 is a structural device diagram of another micro cell node according to an embodiment of the present invention.

In another optional embodiment, referring to FIG. 11, FIG. 11 is a structural device diagram of another micro cell node according to an embodiment of the present invention. The micro cell node further includes: a second receiving unit 1101, configured to receive an RRC message that is transmitted by a user equipment through a random access channel RACH; a second forwarding unit 1102, configured to forward the RRC message and a user equipment identifier to a macro base station; a third receiving unit 1103, configured to receive a bearer establishment request that is between the micro cell node and the macro base station and sent by the macro base station, where the bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user equipment; a first receiving unit 1104, configured to receive, by the micro cell node, the control information sent by the macro base station; and a first forwarding unit 1105, configured to forward the control information to the user equipment, so that the micro cell node implements the RRC function.

This embodiment of the present invention provides a micro cell node. The micro cell node receives control information configured by a macro base station and sends the control information to a user equipment, and therefore, the macro base station assists a micro cell node having no RRC function in completing generation and parsing of dedicated control information of the UE and cell common information, so that the user equipment can camp on or be handed over to the micro cell node.

Figure 12:
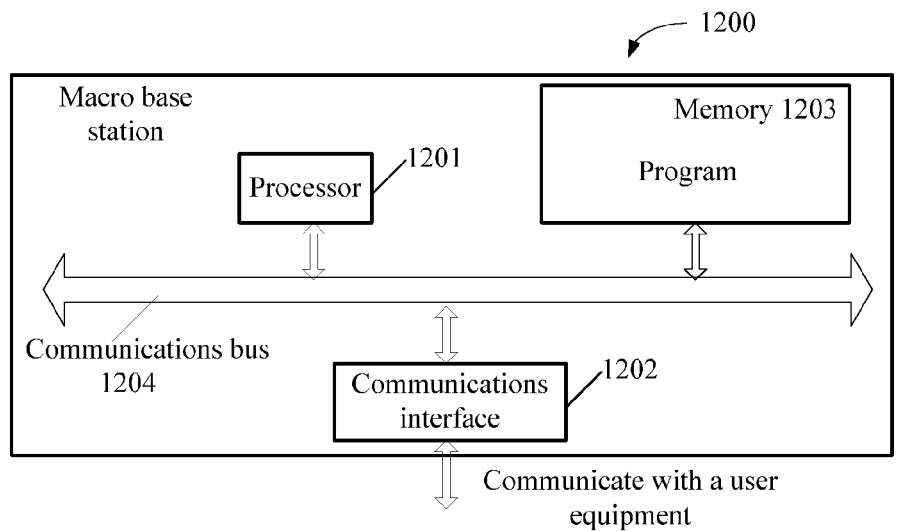
FIG. 12 is a structural apparatus diagram of another macro base station according to an embodiment of the present invention.

Referring to FIG. 12, FIG. 12 is a structural apparatus diagram of another macro base station according to an embodiment of the present invention. Referring to FIG. 12, FIG. 12 is a macro base station 1200 according to an embodiment of the present invention. Specific implementation of the macro base station is not limited in this specific embodiment of the present invention. The macro base station 1200 includes a processor 1201, a chip 1202, a memory 1203, and a bus 1204.

The processor 1201, the chip 1202, and the memory 1203 complete communication with each other by using the bus 1204.

The chip 1202 is configured to communicate with a user equipment, and the macro base station 1200 is connected to a chip of the user equipment by using the chip 1202.

The processor 1201 is configured to execute a program.

Specifically, the program may include program code, where the program code includes a computer operation instruction.

The program is specifically used to configure, by the macro base station, control information; and send the control information to a micro cell node, so that the micro cell node combines the control information and control information that is preset by the micro cell node and then forwards combined control information to a user equipment, or directly forwards the control information to a user equipment, so as to implement all Radio Resource Control protocol RRC functions of the micro cell node.

The control information includes cell common control information and dedicated control information of a user equipment UE, where the cell common control information includes system information and paging information.

Before configuring, by the macro base station, control information required by a UE for accessing a micro cell node, the following is further included performing negotiation between the macro base station and the micro cell node to determine the control information configured by the macro base station, where if the micro cell node has a part of simplified RRC functions and the micro cell node presets a part of control information, the control information configured by the macro base station includes only the dedicated control information of the user equipment UE; or if the micro cell node has no RRC function and/or the micro cell node does not preset control information, the control information configured by the macro base station includes all control information.

The configuring, by the macro base station, control information includes configuring, by the macro base station, a system information transmission configuration parameter for the micro cell node, where the system information transmission configuration parameter is information block content and transmission control information, the information block content includes all or a part of system information block content content, and the transmission control information includes transmission control information of all or the part of the system information block content.

The method further includes: if a transmission control manner of all or the part of the system information block content is fixed, configuring, by the macro base station for the micro cell node, the system information transmission configuration parameter that does not include information block content of a preset transmission control manner; or if the information block content is transmitted in a non-periodic manner, configuring transmission control information that is corresponding to the information block content and includes scheduling information of the system information block content, where the scheduling information includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle, and if scheduling information of the multiple pieces of information block content is the same and the scheduling information includes an information block content group, the scheduling information includes an arrangement sequence of the information block content in the information block content group.

The method further includes configuring, by the macro base station, a modification cycle of the system information of the micro cell node, where the modification cycle includes a cycle length and a start moment.

The method further includes re-configuring, by the macro base station, a system information transmission configuration parameter for the micro cell node; and if content of the system information is updated, specifying, by the macro base station, a start moment at which the system information is updated, where the start moment is a specific moment or is indicated or preset on the micro cell node by the macro base station, and the specific moment is represented by a system frame number and a radio frame number, where that the start moment is indicated or preset on the micro cell node by the macro base station includes that the micro cell node starts to transmit updated content at a start moment of a next or an $N^{th}$ modification cycle.

The configuring, by the macro base station, control information includes: configuring, by the macro base station, a paging information transmission configuration parameter for the micro cell node, where the paging information transmission configuration parameter includes paging information content and paging transmission control information, and the paging transmission control information includes a Radio Link Control RLC transmission configuration parameter, a Media Access Control MAC layer transmission configuration parameter, and physical-layer transmission configuration information, where the paging transmission control information includes a transmission moment corresponding to paging content, where the transmission moment is a moment of one time of transmission or moments of multiple times of transmission.

The method further includes when the transmission moment corresponding to the paging content is the moments of multiple times of transmission, configuring, by the macro base station when configuring the paging transmission control information, the transmission moments by using a transmission moment list or by using a start moment and a transmission cycle.

The processor 1201 may be one or more central processing units CPUs or an application-specific integrated circuit ASIC (Application Specific Integrated Circuit), or may be configured as one or more integrated circuits that implement this embodiment of the present invention.

The memory 1203 is configured to store the program. The memory 1203 may include a high-speed random access memory (RAM for short) or may further include a non-volatile memory.

Figure 13:
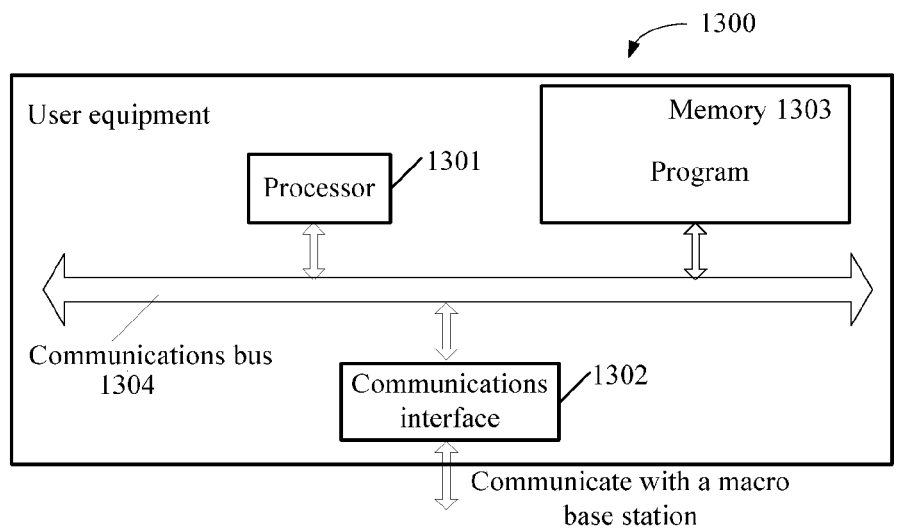
FIG. 13 is a structural apparatus diagram of another micro cell node according to an embodiment of the present invention.

Referring to FIG. 13, FIG. 13 is a structural apparatus diagram of another micro cell node according to an embodiment of the present invention. Referring to FIG. 13, FIG. 13 is a micro cell node 1300 according to an embodiment of the present invention. Specific implementation of the micro cell node is not limited in this specific embodiment of the present invention. The micro cell node 1300 includes a processor 1301, a chip 1302, a memory 1303, and a bus 1304.

The processor 1301, the chip 1302, and the memory 1303 complete communication with each other by using the bus 1304.

The chip 1302 is configured to communicate with a macro base station, and the micro cell node 1300 is connected to a chip of the macro base station by using the chip 1302.

The processor 1301 is configured to execute a program.

Specifically, the program may include program code, where the program code includes a computer operation instruction.

The program is specifically used to receive, by the micro cell node, control information sent by the macro base station; and forward the control information to a user equipment, so that the micro cell node implements a method of an RRC function.

The forwarding, by the micro cell node, the control information to a user equipment includes carrying the forwarded control information by using a signaling radio bearer SRB or a data radio bearer DRB, where a control message transmitted by the SRB includes an RRC message transmitted through a common control channel CCCH or a dedicated control channel DCCH, and the RRC message transmitted through the DCCH is an RRC message including a non-access stratum NAS message and/or measurement information.

The control information includes cell common control information and dedicated control information of a user equipment UE, where the cell common control information includes system information and paging information.

Before a step of receiving the dedicated control information that is of the UE and sent by the macro base station, the method further includes receiving an RRC message that is transmitted by the user equipment through a random access channel RACH; forwarding the RRC message and a user equipment identifier to the macro base station; and receiving a bearer establishment request that is between the micro cell node and the macro base station and sent by the macro base station, where the bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user equipment.

The processor 1301 may be one or more central processing units CPUs, or an application-specific integrated circuit ASIC (Application Specific Integrated Circuit), or may be configured as one or more integrated circuits that implement this embodiment of the present invention.

The memory 1303 is configured to store the program. The memory 1303 may include a high-speed random access memory (RAM for short) or may further include a non-volatile memory.

The foregoing descriptions are merely preferred implementation manners of the present invention, but are not intended to limit the protection scope of the present invention. Any modification, equivalent replacement, or improvement made without departing from the spirit and principle of the present invention shall fall within the protection scope of the present invention.

What is claimed is:

1. A method for implementing a Radio Resource Control (RRC) protocol function, the method comprising:

determining, by a macro base station, control information for a micro cell node in response to a request of a user equipment to access the micro cell node using a RRC protocol function, the micro cell node lacking an ability to implement the RRC protocol function, wherein the control information enables the micro cell node to implement the RRC protocol function to establish a connection with the user equipment, and generate and parse dedicated control information of the user equipment or cell common information;

configuring, by a macro base station, the control information required by the user equipment for accessing the micro cell node; and sending the control information to the micro cell node for combining the control information and control information that is preset by the micro cell node, and forwarding the combined control information to the user equipment, or directly forwarding the control information to the user equipment, so as to implement all RRC protocol functions of the micro cell node;

wherein determining the control information comprises negotiating, by the macro base station, with the micro cell node to determine the control information;

wherein if the micro cell node has a part of simplified RRC protocol functions and the micro cell node presets a part of control information, the control information configured by the macro base station comprises only dedicated control information of the user equipment; and wherein if the micro cell node has no RRC protocol function and/or the micro cell node does not preset control information, the control information configured by the macro base station comprises all control information.

2. The method according to claim 1, wherein the control information comprises cell common control information and dedicated control information of the user equipment, wherein the cell common control information comprises system information and paging information.

3. The method according to claim 1, wherein configuring the control information comprises configuring, by the macro base station, a system information transmission configuration parameter for the micro cell node, wherein the system information transmission configuration parameter comprises information block content and transmission control information, the information block content comprises all or a part of system information block content, and the transmission control information comprises transmission control information of all or a part of the system information block content.

4. The method according to claim 1, wherein configuring the control information comprises configuring, by the macro base station, a paging information transmission configuration parameter for the micro cell node;

wherein the paging information transmission configuration parameter comprises paging information content and paging transmission control information, and the paging transmission control information comprises a Radio Link Control (RLC) transmission configuration parameter, a Media Access Control (MAC) layer transmission configuration parameter, and physical-layer transmission configuration information; and wherein the paging transmission control information comprises a transmission moment corresponding to the paging information content, wherein the transmission moment is a moment of one time of transmission or moments of multiple times of transmission.

5. The method according to claim 4, wherein the method further comprises, when the transmission moment corresponding to the paging information content is the moments of multiple times of transmission, configuring, by the macro base station, the moments by using a transmission moment list or by using a start moment and a transmission cycle when configuring the paging transmission control information.

6. A method for implementing a Radio Resource Control (RRC) protocol function, the method comprising:
receiving, by a micro cell node, control information sent by a macro base station; and
forwarding the control information to a user equipment that requests to access the micro cell node using a RRC protocol function, so that the micro cell node implements the RRC protocol function;
wherein the micro cell node has only a part of simplified RRC protocol functions or has no RRC protocol function, and wherein the control information received from the macro base station comprises dedicated control information of the user equipment or cell common information, and the control information allows the micro cell node to implement the RRC protocol function for establishing a connection with the user equipment; and
wherein if the micro cell node has only the part of simplified RRC functions and the micro cell node presets a part of control information, the control information configured by the macro base station comprises only dedicated control information of the user equipment, and if the micro cell node has no RRC function and/or the micro cell node does not preset control information, the control information configured by the macro base station comprises all control information, comprising cell common control information and the dedicated control information of the user equipment, wherein the cell common control information comprises system information and paging information.

7. The method according to claim 6, wherein forwarding the control information comprises carrying the forwarded control information by using a signaling radio bearer (SRB) or a data radio bearer (DRB), wherein a control information transmitted by the SRB comprises an RRC message transmitted through a common control channel (CCCH) or a dedicated control channel (DCCH), and the RRC message transmitted through the DCCH is an RRC message comprising a non-access stratum NAS message and/or measurement information.

8. A macro base station, comprising:
a processor, configured to:
determine, by negotiating with a micro cell node, control information required by the micro cell node in response to a request of a user equipment to access the micro cell node using a RRC protocol function, the micro cell node lacking an ability to implement the RRC protocol function, wherein the control information enables the micro cell node to implement the RRC protocol function for establishing a connection with the user equipment and for generating and parsing dedicated control information of the user equipment or cell common information, and wherein if the micro cell node has a part of simplified RRC functions and the micro cell node presets a part of control information, the control information configured by the macro base station comprises only the dedicated control information of the user equipment, and if the micro cell node has no RRC function and/or the micro cell node does not preset control information, the control information configured by the macro base station comprises all control information; and
configure the control information; and
a transmitter, configured to send the control information configured by the processor to the micro cell node for combining the control information and control information that is preset by the micro cell node and then forwarding the combined control information to the user equipment, or directly forwarding the control information to the user equipment, so as to implement all Radio Resource Control protocol functions of the micro cell node.

9. The macro base station according to claim 8, wherein the control information comprises cell common control information and dedicated control information of a user equipment, wherein the cell common control information comprises system information and paging information.

10. The macro base station according to claim 8, wherein the processor is configured to configure a system information transmission configuration parameter for the micro cell node, wherein the system information transmission configuration parameter is information block content and transmission control information, the information block content comprises all or a part of system information block content, and the transmission control information comprises transmission control information of all or a part of the system information block content.

11. The macro base station according to claim 8, wherein the processor is configured to configure a paging information transmission configuration parameter for the micro cell node;
wherein the paging information transmission configuration parameter comprises paging information content and paging transmission control information, and the paging transmission control information comprises a Radio Link Control (RLC) transmission configuration parameter, a Media Access Control (MAC) layer transmission configuration parameter, and physical-layer transmission configuration information; and
wherein the paging transmission control information comprises a transmission moment corresponding to paging content, wherein the transmission moment is a moment of one time of transmission or moments of multiple times of transmission.

12. The macro base station according to claim 11, wherein the processor is further configured to configure transmission moments by using a transmission moment list or by using a start moment and a transmission cycle when configuring the paging transmission control information.

13. A micro cell node, comprising:
a receiver, configured to receive control information sent by a macro base station, the control information sent in response to a request of a user equipment to access the micro cell node using a RRC protocol function; and
a processor, configured to forward the control information to the user equipment, so that the micro cell node implements the RRC protocol function;
wherein the micro cell node has only a part of simplified RRC functions or has no RRC function, and wherein the control information received from the macro base station comprises dedicated control information of the user equipment or cell common information, and enables the micro cell node to implement the RRC function so that the user equipment attaches or is handed over to the micro cell node;

wherein the control information sent by the macro base station comprises only dedicated control information of the user equipment when the micro cell node has a part of simplified RRC protocol functions and the micro cell node presets a part of control information; and wherein the control information sent by the macro base station comprises all control information, comprising cell common control information and the dedicated control information of the user equipment when the micro cell node has no RRC protocol function and/or the micro cell node does not preset control information, wherein the cell common control information comprises system information and paging information.

14. The micro cell node according to claim 13, wherein the processor is configured to carry the forwarded control information by using a signaling radio bearer (SRB) or a data radio bearer DRB, wherein a control message transmitted by the SRB comprises an RRC message transmitted through a common control channel (CCCH) or a dedicated control channel (DCCH), and the RRC message transmitted through the DCCH is an RRC message comprising a non-access stratum (NAS) message and/or measurement information.

15. The micro cell node according to claim 14, wherein the processor is further configured to:
receive an RRC message that is transmitted by the user equipment through a random access channel (RACH);
forward the RRC message and a user identifier to the macro base station; and
receive a bearer establishment request that is between the micro cell node and the macro base station and sent by the macro base station, wherein the bearer establishment request comprises a configuration parameter for establishing a control signaling transmission bearer that is between the macro base station and the micro cell node and corresponding to the signaling radio bearer and a configuration parameter for establishing a signaling radio bearer between the micro cell node and the user equipment.

\* \* \* \* \*